Figure 1:
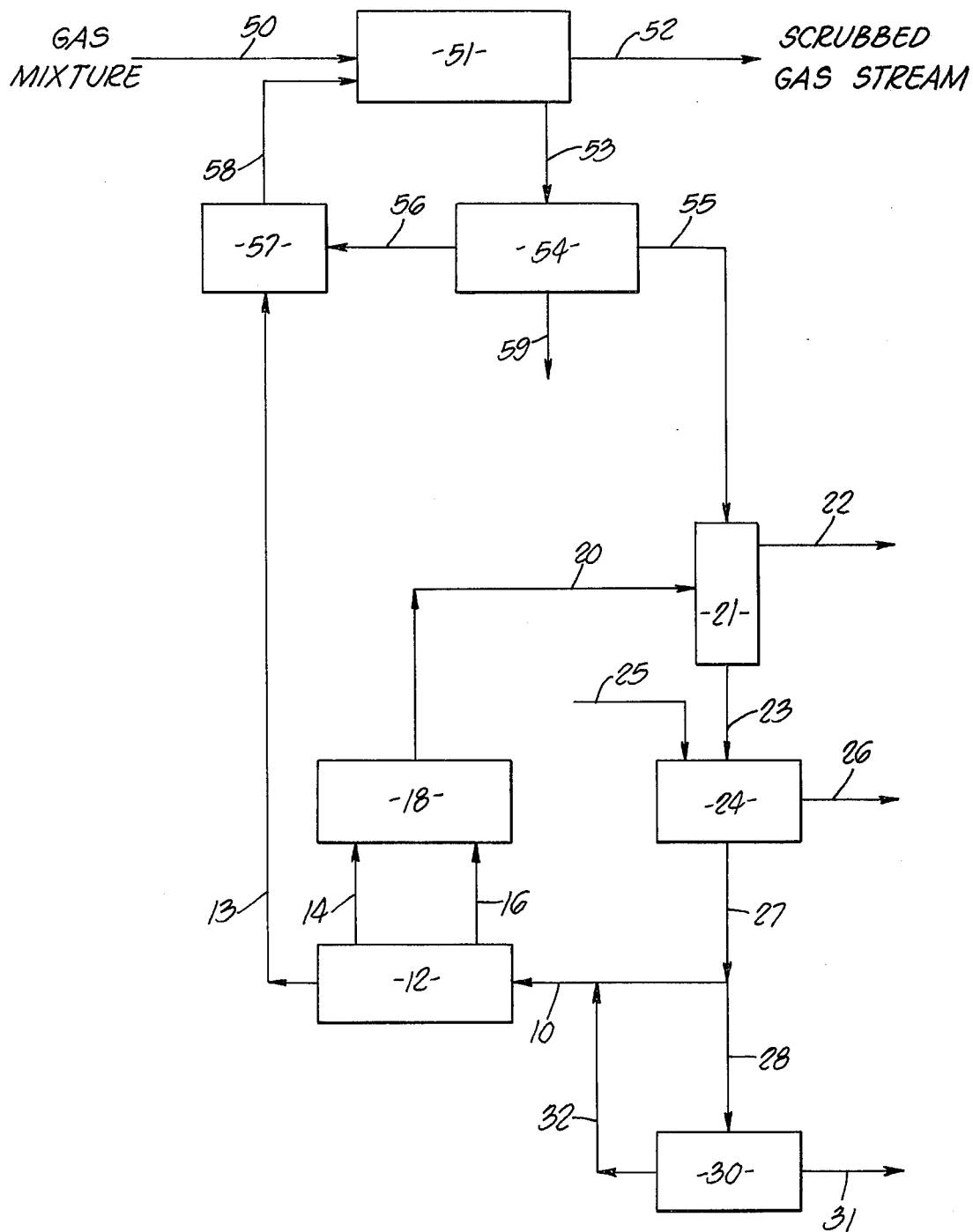

United States Patent [19]

Cooper

[11] 4,069,117

[45] Jan. 17, 1978

[54] PROCESS FOR REMOVING AND RECOVERING ACIDIC GASES FROM GASEOUS MIXTURES CONTAINING THEM

[76] Inventor: Hal B. H. Cooper, 4234 Chevy Chase Drive, Pasadena, Calif. 91103

[21] Appl. No.: 653,400

[22] Filed: Jan. 28, 1976

[51] Int. Cl.$^2$ .................... C25B 1/20; C25B 1/26; C01B 31/20; C01B 17/60
[52] U.S. Cl. ................................. 204/98; 204/103; 204/128
[58] Field of Search ............... 204/92, 128, 98, 103; 423/220, 234, 233, 242, 541

[56] References Cited

U.S. PATENT DOCUMENTS

| | | | |
|---|---|---|---|
| 2,967,807 | 1/1961 | Osborne et al. | 204/98 |
| 3,220,941 | 11/1965 | Osborne | 204/92 |
| 3,475,122 | 10/1969 | McRae et al. | 204/98 |
| 3,801,698 | 4/1974 | Lowrance et al. | 204/98 |

OTHER PUBLICATIONS

General Chemistry, H. H. Sisler, 1949, pp. 410, 470.
General College Chemistry, J. A. Babor et al., 1940, p. 368.
"Hydrochloric Acid", Kirk Othmer Encyclopedia of Chem. Technology, Second Ed., vol. 11, p. 313.

Primary Examiner—R. L. Andrews
Attorney, Agent, or Firm—Elwood S. Kendrick; Patrick F. Bright

[57] ABSTRACT

A process for the removal and recovery of acidic gas(es) from a gaseous mixture comprising electrolysis of a chloride salt to produce an aqueous metal hydroxide solution, hydrogen and chlorine. The metal hydroxide solution is used to absorb acidic gas from the gaseous mixture and to form an aqueous metal salt. The hydrogen and chlorine are reacted to produce hydrochloric acid, which is used to decompose the aqueous metal salt to produce an aqueous chloride salt and acidic gas. Following separation, the aqueous chloride salt may be electrolyzed again.

5 Claims, 2 Drawing Figures

PROCESS FOR REMOVING AND RECOVERING ACIDIC GASES FROM GASEOUS MIXTURES CONTAINING THEM

This invention relates to the treatment of gaseous mixtures to remove acidic constituents therefrom. In a preferred embodiment, the invention relates to a cyclic system for selectively recovering substantially pure sulfur dioxide from a gaseous mixture containing it, such as power plant stack gas.

A less desirable process for this purpose is described in the Aug. 10, 1968 issue of *Chemical Week*, pages 51 and 52. This process employs a membrane-type electrochemical cell that generates caustic soda, sodium acid sulfate, dilute sulfuric acid, oxygen and hydrogen from a solution of sodium sulfate. The caustic produced in the cell is used to absorb sulfur dioxide from stack gas to form sodium bisulfite. The sodium bisulfite is stripped of sulfur dioxide, and fed to a sulfuric acid plant. Sodium sulfate from the stripper is fed to the cell for electrolysis.

The instant invention permits use of a simpler, more efficient electrolytic cell, and desirably produces little sulfuric acid and sulfate salt, which have low value. The rather pure sulfur dioxide produced by this invention may be readily converted to elemental sulfur or used to make other compounds.

This invention provides a cycle method for treatment of gaseous mixtures to remove and recover therefrom, in substantially pure form, a substantial quantity of acidic constituents such as sulfur dioxide, oxides of nitrogen, hydrogen sulfide, carbon dioxide, hydrogen chloride and hydrogen fluoride. In this method, alkali metal chloride is ordinarily the only material that is consumed in makeup quantities.

The method of this invention utilizes an electrolytic cell to produce aqueous alkali metal hydroxide, chlorine and hydrogen. This aqueous metal hydroxide is used to remove at least one acidic gas from a mixture of gases in the form of at least one aqueous metal salt. The hydrogen and chlorine are reacted to form hydrochloric acid. For this purpose, a suitable, known unit may be used, such as that described in the *Encyclopedia of Chemical Technology*, Second Edition, Volume II, Page 313 and following, Kirk-Othmer. The hydrogen chloride produced may be mixed with water to form an aqueous hydrochloric acid solution. The aqueous alkali metal salts are decomposed by reaction with hydrochloric acid gas or aqueous hydrochloric acid to form aqueous alkali metal chloride, and to liberate the gaseous acids. The liberated acid gases are separated from the agueous metal chloride, and, in the preferred embodiment, the aqueous metal chloride is fed to the electrolytic cell, preferably following purification to remove impurities such as sodium sulfate. Thus, the method of this invention is cyclic in its preferred embodiment and alkali metal chloride or other metal salt is consumed in minimal quantities.

The process of the invention is suitable for the removal of many different acidic gases from mixtures of gases that may include sulfur dioxide, carbon dioxide, hydrogen sulfide, hydrogen chloride, oxides of nitrogen and others. The alkali metal chloride is preferably sodium chloride. However, other alkali metal chlorides such as potassium chloride may be used.

Figure 2:
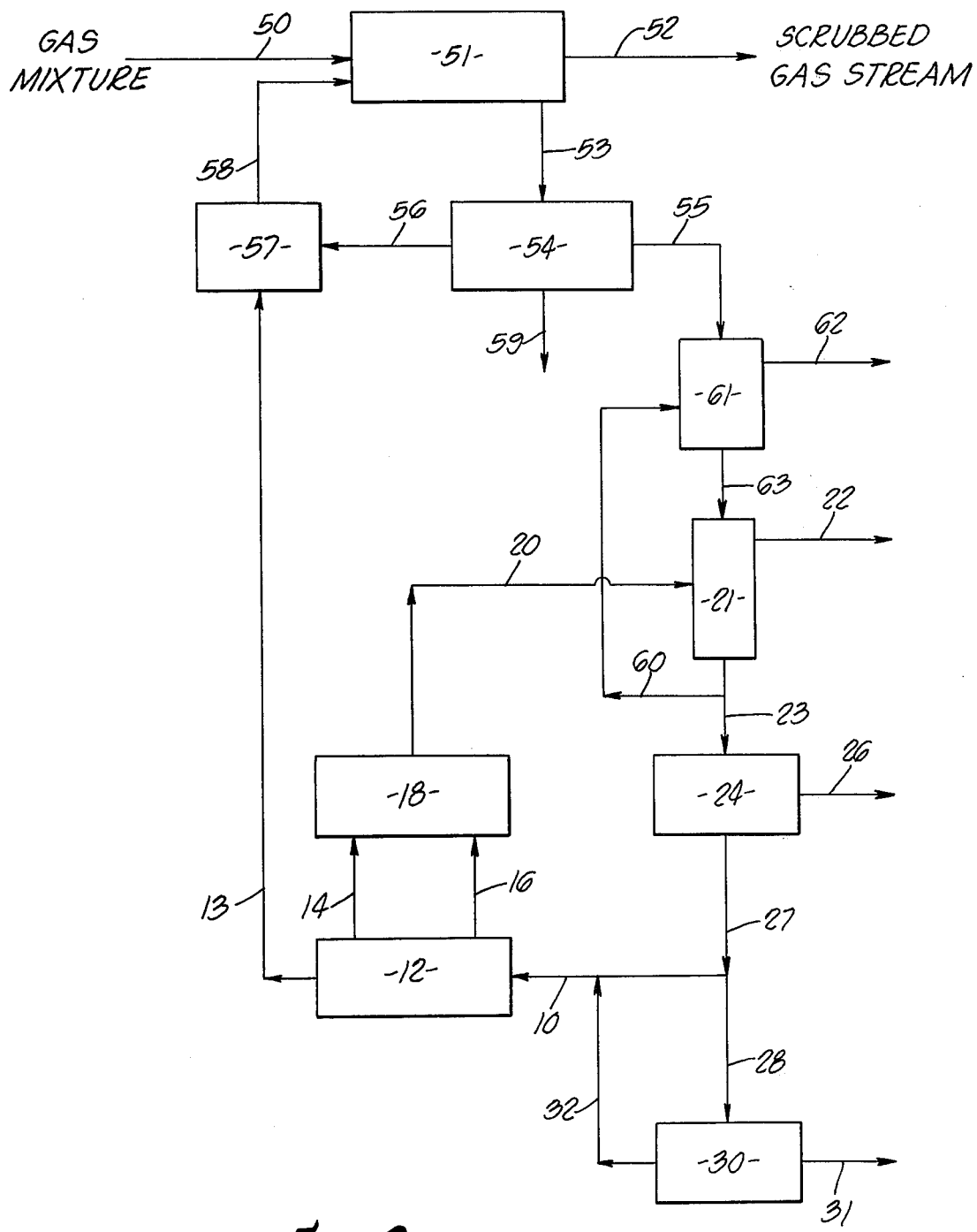

Many advantages of the method of this invention are apparent from the accompanying illustrative drawings in which:

FIG. 1 is a flow diagram of a cyclic system for the removal and recovery of sulfur dioxide from a gas mixture containing both sulfur dioxide and carbon dioxide; and FIG. 2 is a diagram of another cyclic system for the removal and recovery of sulfur dioxide and carbon dioxide from a gas mixture containing both.

Referring to FIG. 1, aqueous alkali metal chloride, such as sodium chloride, is supplied through line 10 to electrolytic cell 12, which electrolyzes the brine into an aqueous sodium hydroxide (caustic soda) solution, and hydrogen and chlorine gases. The aqueous caustic soda solution, which generally has a concentration in the range of about 5 to about 20%, is removed from the cell via line 13. The hydrogen and chlorine gases are delivered by lines 14 and 16, respectively, to a hydrochloric acid reactor 18, where the hydrogen and chlorine react to produce hydrogen chloride vapor which is transferred via line 20 to absorber-stripper 21. There, the hydrogen chloride vapors are mixed with an aqueous alkali metal salt liquor to liberate an acidic gas such as sulfur dioxide from a metal salt thereof. Alternatively, the hydrogen chloride vapor may first be absorbed into water, and the aqueous acid solution resulting may then be fed to stripper 21.

The caustic soda solution from line 13 is fed to scrubber 51 where at least one acidic constituent of a gas stream entering via line 50 reacts with the aqueous solution to form a metal salt of the acid gas. The aqueous metal salt solution passes via line 53 to solids remover 54, which may be a settler, where entrained solids, if any, are removed. The clarified stream 55 is fed to stripper 21 where the hydrogen chloride entering via line 20 acidifies the solution and liberates acidic gas, as illustrated by the following reaction:

$$NaHSO_3 + HCl \rightarrow SO_2 \uparrow + NaCl + H_2O$$

The liberated gas leaves stripper 21 via line 22 and the aqueous solution of metal halide formed leaves stripper 21 via line 23.

The caustic soda solution passing to scrubber 51 via line 13 may have its concentration adjusted by mixing the solution in pH controller 57 with a scrubbing solution fed from solids remover 54 via line 56. The pH is adjusted to a value in the range of pH 5 to 7 if only sulfur dioxide is to be removed. At pH's in the range of 7 to 8, carbon dioxide, if any is present in gas stream 50, could also be absorbed and the product obtained from stripper 21 could be a mixture of sulfur dioxide and carbon dioxide. However, as FIG. 2 illustrates, carbon dioxide and sulfur dioxide may be liberated separately from the liquor passing from scrubber 51. Thus, the mixture of metal salts may first pass to stripper 61 to which the acidified solution passing from stripper 21 and having a pH of about 3.0 to about 3.5 is passed via line 60 to effect removal and recovery of carbon dioxide which exits stripper 61 via line 62. The sulfur dioxide remains in solution in the form of sodium sulfite and sodium bisulfite and passes to stripper 21 via line 63 where the sulfur dioxide is liberated as explained above.

In concentrator 24, which may be an evaporator, metal salt solution passing from stripper 21 via line 23 is concentrated to insure a high metal halide concentration in the feed to cell 12. Excess water is removed via line 26. The concentrated metal halide leaves by line 27 and may be fed to cell 12 directly, or alternatively, may be purified by removing a portion, or all, of streams 27 and then returning it to line 10 through line 32 following purification.

Where the acidic gas is sulfur dioxide, a common impurity to be removed is alkali metal sulfate which results from oxidation of sulfur dioxide in scrubber 51, or from prior oxidation. By cooling the hot, concentrated alkali metal halide solution in crystallizer 30, a salt such as Glauber's salt (sodium sulfate decahydrate), crystallizes and may be removed. Other impurities may be removed by conventional, known methods.

Electrolytic cell 12 may be of the kinds illustrated in U.S. Pat. Nos. 3,135,673; 3,222,267 and 3,390,065. The alkali metal salt solution is introduced to the anodic compartment of cell 12 which has a diaphragm, normally a cationic permselective ion-exchange membrane, separating the anode and cathode compartments. Direct current is passed transversely through the anode and cathode compartments and the diaphragm to produce chlorine at the anode and hydrogen and aqueous alkali metal hydroxide at the cathode.

The diaphragm of the cell may be made of felt, cloth, asbestos, Teflon, polyvinyl chloride or any other material which will withstand corrosive conditions in the cell. Preferably, the diaphragm is a cationic permselective membrane that is impervious to the passage of liquid anolyte and catholyte solution.

A preferred cationic permselective membrane is Nafion-XR, a perfluorosulfonic acid polymeric material made by Dupont. The membrane is provided in the form of a completely fluorinated polymer containing pendant sulfonic acid groups. The membranes have high chemical, thermal and oxidative stability.

What is claimed is:

1. A cyclic and regenerative process for the removal and recovery of at least one acid gas from a mixture of gases including carbon dioxide comprising: electrolyzing an aqueous alkali metal chloride in a two-compartment cell including a cationic permselective ion-exchange membrane between the anode and cathode compartments to produce chlorine, hydrogen and aqueous alkali metal hydroxide; producing hydrochloric acid from said hydrogen and said chlorine; treating said mixture with said aqueous alkali metal hydroxide to form aqueous alkali metal carbonate/bicarbonate and to form aqueous alkali metal salt from said at least one acid gas; reacting said hydrochloric acid with said aqueous alkali metal salt to form aqueous alkali metal chloride and liberate said acid gas for recovery; and cycling said aqueous alkali metal chloride to said electrolyzing for production of hydrogen, chlorine and aqueous alkali metal hydroxide.

2. The process of claim 1 wherein the said at least one acid gas is sulfur dioxide, the said gas mixture is derived from the combustion of carbonaceous fuels, and said alkali metal salt is alkali metal sulfite/bisulfite.

3. The process of claim 1 wherein the gaseous mixture contains sulfur dioxide and carbon dioxide.

4. The process of claim 3 wherein the hydrochloric acid is utilized to liberate separately the sulfur dioxide and the carbon dioxide.

5. The process of claim 4 wherein said aqueous alkali metal hydroxide used to remove the sulfur dioxide and carbon dioxide from said mixture of gases has a pH in the range 4–8, thus forming a mixture of metal salts of carbon dioxide and sulfur dioxide, and said carbon dioxide is selectively removed from said mixture by contacting said mixture with hydrochloric acid to a pH in the range of about 3.5 to about 4.5.

* * * * *